Oct. 24, 1933.   J. A. MAURER, JR   1,931,668

MULTIPLE MOTION PICTURE PROJECTION

Filed Sept. 19, 1930

INVENTOR
J. A. MAURER, JR.
BY
ATTORNEY

Patented Oct. 24, 1933

1,931,668

UNITED STATES PATENT OFFICE 1,931,668

MULTIPLE MOTION PICTURE PROJECTION

John A. Maurer, Jr., New York, N. Y., assignor to Radio Corporation of America, a corporation of Delaware Application September 19, 1930
Serial No. 482,961

3 Claims. (Cl. 88—24)

The object of the present invention is to provide a system and apparatus for the simultaneous projection of a plurality of motion pictures.

Another object of this invention is to provide a method and apparatus for the simultaneous projection of a plurality of motion pictures from a single motion picture film.

Still another object of this invention is to provide a system and apparatus for the simultaneous projection of a plurality of motion pictures from a single motion picture film by a single motion picture projector.

A further object of this invention is to provide a system and apparatus for the simultaneous projection of a plurality of motion pictures by means of screens arranged for back-stage projection from a single projector utilizing a single condenser and projection lens.

A more specific object of this invention is to provide a system and apparatus for back-stage projection of a plurality of motion pictures from a single film by means of a single projector utilizing a new and novel arrangement of reflecting mirrors.

These and other objects of my invention will become apparent from the following specifications taken in connection with the accompanying drawing.

In accomplishing the objects of my invention, a single motion picture projector is disposed back of a plurality of motion picture screens arranged on the sides of a regular prism of say 3, 4 or 6 sides. There is arranged in front of the projector at a proper distance therefrom, a mirror arrangement which is adapted to divide the ray bundle of the light being emitted by the projector, in such a manner as to send out equal amounts of said bundle to each of the screens, and thus produce simultaneously three or more motion pictures. The mirrors are arranged at such a distance from the projector lens that they will each receive rays from all parts of the picture with an equal intensity. The method of accomplishing this will be described in detail hereinafter.

Having thus briefly described my invention, attention is invited to the accompanying drawing in which.

Figure 1:
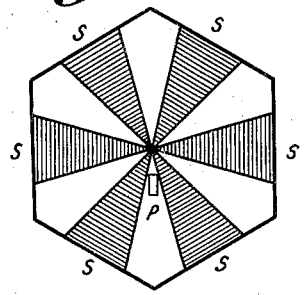
Fig. 1 is a general view showing the arrangement of the screens relative to a single projector.

Attention is now invited particularly to Fig. 1 in which P represents a projector and S, S, S are the viewing screens. The audience is arranged in fan-shape arrangement outside of the hexagon. It is to be understood that the motion picture projector P may be at the same time a film phonograph for the reproduction of sound in connection with the pictures, or a separate phonograph may be used operated in synchronism for the sound accompaniment, as is well known in the art.

Figure 2:
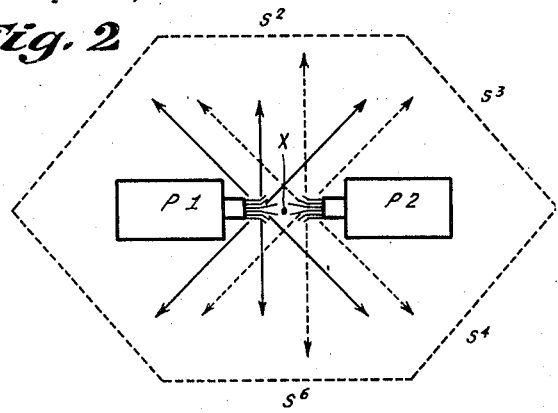
Fig. 2 is a schematic diagram showing the arrangement of a pair of projectors for simultaneous projection upon a plurality of screens.

Fig. 2 shows the arrangement wherein two projectors P1 and P2 are used to give continuous performance. The dotted lines merely represent the position of the 6 screens relative to the two projectors. X of Fig. 2 represents the location midway between the two projectors.

Figure 3:
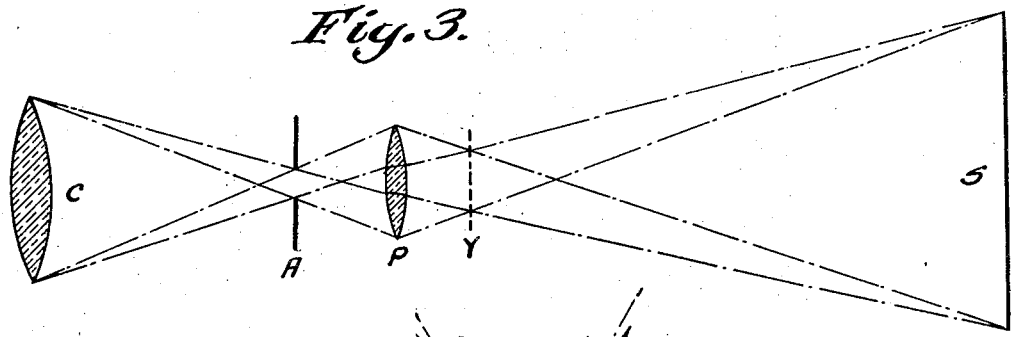
Fig. 3 is a diagram showing the optical system involved in order to explain the principles upon which my invention is based.

The objects of my invention are accomplished by methods operating in accordance with the following principles:

In the optical system of a motion picture projector, I have, as shown in Fig. 3, a condenser lens C for illuminating the film passing the aperture A and a projection lens P for forming an enlarged image of the film on the screen S. Now in the light beam between the projection lens P and the screen S, there is a plane in which there is formed an image of the condenser lens C. If this system is arranged so that the projection lens picks up all of the light which has passed through the film, and if, further, every point of the condenser lens sends light to every point of the film aperture A, it follows that through every point of this plane, which is indicated by the dotted line Y, there pass rays of light which are capable of forming a complete picture on the screen. That is, if I cut off the light beam at the plane of the condenser image by an opaque screen, and then make a pin hole anywhere in this screen where there is light to pass through it, the light thus transmitted will form a complete picture on the screen. Again, if I pass a card gradually across the light beam in the plane Y, the effect is a uniform decrease of light intensity in the intensity all over the picture, whereas if the card is inserted in the beam either closer to or farther from the point P, the effect is that of a shadow cutting off part of the picture while the rest remains bright.

A further consequence of this property of the light beam at the plane Y of the condenser image, is that, if I insert at that plane a numer of small plane mirrors each of which take up only part of the cross-section of the beam, I can reflect, at various angles, pencils of light which will form complete pictures if received upon screens at the correct distance to obtain sharp focus. Since each reflection of the light beam from a mirror reverses the picture from right to left, or else inverts it depending upon the direction in which the reflection deviates the ray of light, it is necessary to thread the film into the projection in the correct orientation. Thus, if each picture is formed after one reflection and is viewed from the back of a translucent screen, and the reversal due to the type of screen corrects for that due to the reflection, and the picture will come out in the proper way provided the film is threaded in the normal manner. The same will be true if three or any other odd number of reflections takes place. However, if the number of reflections is even or the picture is to be viewed on an opaque screen, the film must be threaded with the celluloid side next to the condenser which is the reverse of the usual procedure.

In order that the picture obtained may not be tilted out of the perpendicular, it is necessary that the projector be kept level and that all of the mirrors inserted in the light beam have their planes vertical. This amounts to saying that for every reflection, the plane determined by the incident and reflected light beams must be horizontal. If it is desired to raise or lower a picture, this may be accomplished by a second reflection in which the plane determined by the incident and reflected rays is vertical. Any reflection in a plane determined by these two beams which is not either vertical or horizontal will result in a tilted picture. Thus for the arrangement shown for instance in Fig. 2, it would either be necessary that the objectives of the two projectors be on the center of the viewing screens or that the rays of light from the two machines be vertically elevated in some manner either before or after reflection.

It is to be noted that the mirror groups of Fig. 2 may be arranged so close together that the shift incident upon shift of projection from one projector to the projector of another, will not cause another shift of the picture on the screen.

Figure 4:
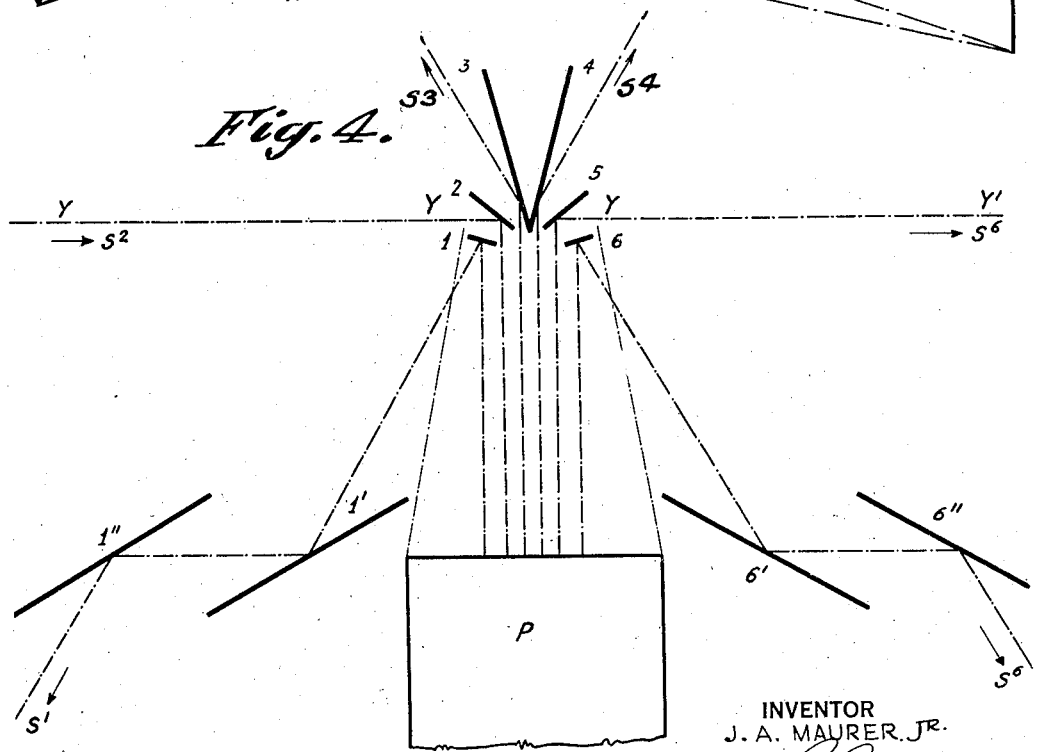
Fig. 4 is a diagram showing the preferred mirror arrangement for carrying out the objects of my invention.

Referring now more particularly to Fig. 4, the projection lens of the projector is shown at P, and the image of the condenser would be formed on the line Y'—Y'. The ray bundle thus produced on the plane Y'—Y' is divided by means of vertically disposed mirrors 1, 2, 3, 4, 5 and 6 which are each arranged to intercept approximately one sixth of the entire ray bundle. The vertical axis of each of these mirrors is arranged to be as close as possible to the line Y'—Y', and each mirror is arranged at such an angle as to reflect the beams of light coming to it at the angle required to project upon one of the six viewing screens. The mirrors 2 and 5, for instance, are arranged at a 45° angle to the incident beam in order to project the ray at right angles from the projector to form the image of the screens S2 and S6 of Fig. 2. The mirrors 3 and 4 are arranged at such an angle, for instance, to project the beams of light projected upon it in the direction of screens S3 and S4. Mirror 1 is arranged at such an angle to project the beam of light in the direction S1, but in order to prevent the operator and remainder of the machine from interfering with this image, it is necessary to use the auxiliary mirrors 1' and 1''. Similarly, the mirror 6 projects an image in the direction of screen S6 and the auxiliary mirrors 6' and 6'' are used to prevent the machine and operator from interfering with the image formed.

By the arrangement shown in Fig. 4, the conditions for even illumination of all 6 pictures can be met by a projection lens of aperture F2.0, used with a condenser 5½ inches in diameter located 20 inches behind the film aperture. This permits efficiency great enough that with a high intensity arc as a light source, it would be possible to obtain 6 pictures 12 feet wide, each having adequate illumination.

Having thus described my invention, attention is invited to the fact that various modifications may be made falling clearly within its scope, and that I am therefore not to be limited by its specific form shown and described for the purpose of illustration only, but by the scope of my invention as set forth in the appended claims.

I claim:

1. Means for the simultaneous projection of a plurality of motion picture images which comprises reflecting means for dividing the ray bundle of a motion picture projector arranged at such a point of the projected beam of said projector that reflection of any portion of the ray bundle will produce a complete image, and an even number of auxiliary mirrors so arranged between the said reflecting means and images whose path lies laterally adjacent to the projector to prevent certain of said images from being interfered with by the projector or operator.

2. Means for the simultaneous projection of a plurality of motion picture images which comprises reflecting means for dividing the ray bundle of a motion picture projector arranged at such a point of the projected beam of said projector that reflection of any portion of the ray bundle will produce a complete image, and an even number of auxiliary mirrors so arranged between the said reflecting means and images whose path lies laterally adjacent to the projector to prevent certain of said images from being interfered with by the projector or operator, said auxiliary mirrors being thereby so disposed as to prevent reversal of the image relative to the images projected on the remaining screens.

3. Means for the simultaneous projection of a plurality of motion picture images which includes a plurality of coaxial projectors each combined with reflecting means for dividing the ray bundle of the motion picture projector arranged at such a point of the projected beam of said projector that reflection of any portion of the ray bundle will produce a complete image, and an even number of auxiliary mirrors so arranged between the said reflecting means and images whose path lies laterally adjacent to the projector to prevent certain of said images from being interfered with by the projector or operator.

JOHN A. MAURER, Jr.